J. W. WEISS.
ELECTRIC BATTERY AND METHOD OF OPERATION.
APPLICATION FILED JAN. 20, 1920.
1,358,350.
Patented Nov. 9, 1920.
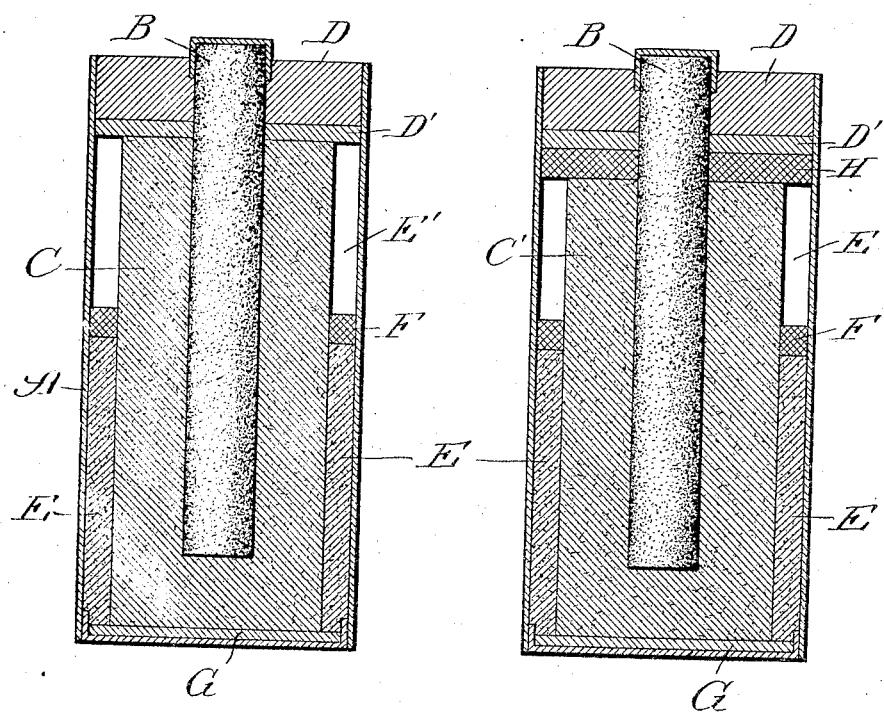
Inventor:
Joseph W. Weiss,
By Dyrenforth, Lee, Chritton & Wiles,
Attys.

UNITED STATES PATENT OFFICE.

JOSEPH W. WEISS, OF NEWARK, NEW JERSEY, ASSIGNOR TO FRENCH BATTERY & CARBON CO., OF MADISON, WISCONSIN, A CORPORATION OF WISCONSIN.

ELECTRIC BATTERY AND METHOD OF OPERATION.

1,358,350.

Specification of Letters Patent.

Patented Nov. 9, 1920.

Application filed January 20, 1920. Serial No. 352,873.

*To all whom it may concern:*

Be it known that I, JOSEPH W. WEISS, a citizen of the United States, residing at Newark, in the county of Essex and State of New Jersey, have invented a new and useful Improvement in Electric Batteries and Methods of Operation, of which the following is a specification.

This invention relates particularly to dry cell batteries and a method of operating the same. The primary object of the invention is to provide a battery having increased efficiency by reason of its capability of maintaining a more uniform rate of discharge during the life of the battery. A further object is to provide means for increasing the effective amount of the depolarizing agent in a dry cell of standard dimensions, thus increasing the ultimate total efficiency of the battery. Another object is to provide an improved method of operating a dry cell, whereby improved results and greater ultimate total efficiency is secured.

The invention is illustrated, in its preferred embodiment, in the accompanying drawing, in which—

Figure 1 represents a sectional view of a dry cell embodying the invention; and Fig. 2, a sectional view, showing a modification.

Referring to Fig. 1, A represents a zinc container constituting the positive electrode of the cell; B, a carbon rod constituting the negative electrode of the cell; C, a core of compacted depolarizing mixture, usually comprising manganese dioxid and carbonaceous material, in which the carbon pole B is embedded; D, a pitch seal closing the top of the container and disposed above a washer D' which rests upon the upper end of the core C; and E, electrolyte, usually comprising ammonium chlorid, zinc chlorid, water and starch, or some material containing starch, the starch being gelatinized so that the electrolyte is in the form of a paste, or jelly-like body.

Heretofore it has been the practice to fill the annular space between the core and the can with electrolyte to about the upper end of the core, and to leave an air space above the core to allow for the expansion of electrolyte and the production of gases.

In accordance with the present invention, an annular air space is left between the upper portion of the core and the container, this space being designated E'. This space should be of substantial height, so that initially substantial portions of the core and the can will not be in operative relation. In the illustration given, the annular space surrounding the core is filled with electrolyte to approximately half the length of the core. It is the purpose of the invention to utilize the expansion of electrolyte in the operation of the cell to throw successive portions of the core and can into operative relation. If desired, a packing washer F, of cotton or other suitable material, may be introduced into the annular space above the electrolyte, so that as the electrolyte expands, the packing washer will be forced upwardly, and by reason of the frictional contact will offer a certain resistance to the expansion of the electrolyte and tend to cause the electrolyte to properly bridge the space between the can and core, thus giving, as far as possible, continuity of the electrolyte between the core and can as successive portions of these elements are brought into operative relation through the medium of the expanding electrolyte. However, the packing washer F may be omitted, if desired. The feature of creating resistance to the expansion of the electrolyte, by special means, such as said packing-washer, forms no part of my invention and is not claimed herein, but constitutes the subject-matter of the application of Otto E. Ruhoff, Serial No. 352,823, filed January 20, 1920.

The core C may be enveloped in a gauze packing, or any other bibulous covering, such as paper, or pasteboard, if desired; or the core may be left in an uncovered condition, if desired. In any case, the purpose is to preserve a substantial annular space E' above the electrolyte and utilize the expansion of the electrolyte to throw successive portions of the core and can into operative relation.

It will be noted that by the arrangement described, a longer core may be employed than is employed in the usual cell of this type. Initially, only the lower portions of the zinc container and the core are in operative relation. This suffices, however, to give the necessary voltage and necessary rate of discharge, or current capacity, when the battery is first put into use. As the operation of the battery proceeds, successive portions of the core and can are automatically brought into operative relation as the electrolyte expands. The result is to give a better-sustained rate of discharge for the cell during its life. The result is a more uniform and effective use of the current-giving capacity of the dry cell.

It is usual to insert between the lower end of the core and the bottom of the can a disk of paraffined paper, or the like. Such a disk is indicated at G.

In the modification shown in Fig. 2, the construction is the same as has been described with reference to Fig. 1, except that the core, designated C', is of less height, and a packing washer, H, of cotton or other yielding or compressible material is interposed between the top of the core and the ordinary washer employed above it. Except for this difference, the construction corresponds with Fig. 1, and the corresponding parts are given corresponding reference characters.

In the construction shown in Fig. 2, the operation is the same as described, except that when the packing washer F is forced, by the expansion of the electrolyte, into contact with the packing washer H, there is an added thickness of the compressible material, tending to compact the expanding electrolyte.

Various modifications of the invention are contemplated.

The foregoing description has been given for clearness of understanding only, and no unnecessary limitations should be understood therefrom, but the appended claims should be construed as broadly as permissible, in view of the prior art.

What I regard as new, and desire to secure by Letters Patent, is:

1. In a dry cell, a receptacle affording a positive electrode, a carbon electrode therein having a core of depolarizing material thereon, and paste-like electrolyte filling the lower portion of the space between said core and the surrounding wall of the container, the upper portion of said space surrounding a substantial portion of said core being free to receive electrolyte as the same expands in the use of the cell, whereby successive portions of the core and positive electrode are brought into operative relation as the operation of the battery proceeds.

2. In a dry cell, a zinc receptacle affording a positive electrode, a carbon electrode therein having a core of depolarizing material thereon, said core being of substantially less cross-section than said receptacle, a seal between the upper portion of the carbon electrode and the receptacle, and paste-like electrolyte filling the lower portion of the space between said core and the surrounding wall of the container, the upper portion of said space surrounding a substantial portion of said core being free to receive electrolyte as the same expands in the use of the cell, whereby successive portions of the core and receptacle are brought into operative relation by the operation of the battery.

3. The method of operating a dry cell which consists in introducing into the receptacle between the core of depolarizing mixture and the surrounding wall of the receptacle, a quantity of electrolyte which will afford connection between a limited area of the core and the receptacle, and utilizing the expansion of the electrolyte as the cell operates to bring successive portions of the core and receptacle into operative relation.

4. The method of operating a dry cell, comprising a zinc container and a carbon electrode embedded in a core of depolarizing mixture, with an annular space between the core and the can, which consists in filling the lower portion only of said annular space with a paste-like electrolyte and utilizing the expansion of said electrolyte in the operation of the cell to progressively fill the annular space with electrolyte and thereby throw successive portions of said core and the surrounding wall of the can into operative relation.

JOSEPH W. WEISS.